(No Model.)
T. A. BUTLER.
COMBINED ROLLER AND SEED SOWER.
No. 449,754. Patented Apr. 7, 1891.
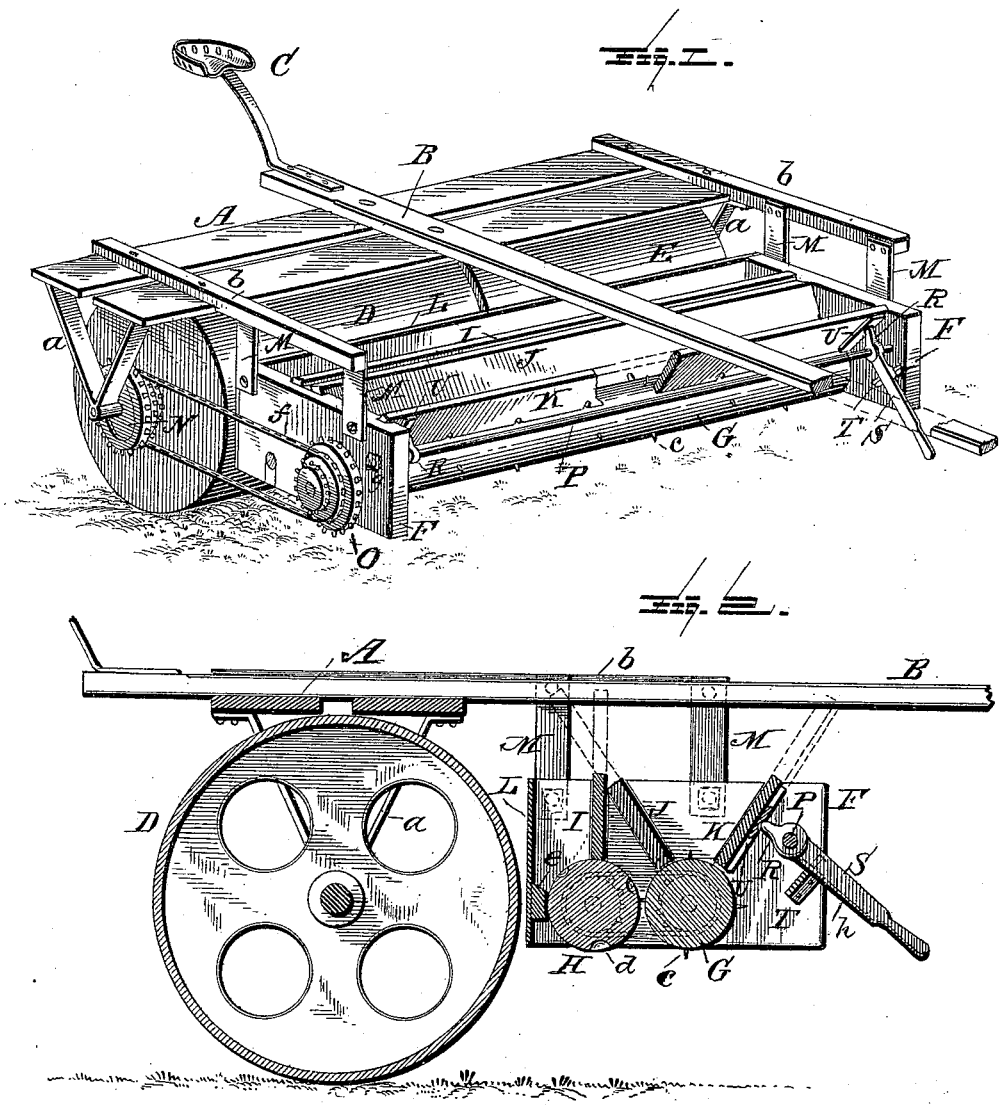

UNITED STATES PATENT OFFICE.

THOMAS A. BUTLER, OF OLIVER SPRINGS, TENNESSEE.

COMBINED ROLLER AND SEED-SOWER.

SPECIFICATION forming part of Letters Patent No. 449,754, dated April 7, 1891.

Application filed January 6, 1891. Serial No. 376,888. (No model.)

*To all whom it may concern:*

Be it known that I, THOMAS A. BUTLER, a citizen of the United States, residing at Oliver Springs, in the county of Anderson and State of Tennessee, have invented certain new and useful Improvements in a Combined Roller and Seed-Sower; and I do hereby declare that the following is a full, clear, and exact description of the same, reference being had to the annexed drawings, making a part of this specification, and to the letters of reference marked thereon.

Figure 1 of the drawings represents a perspective view of my invention; Fig. 2, a longitudinal vertical section thereof.

The present invention has relation to combined rollers and seed-sowers, and is designed as an improvement upon my former patent of September 10, 1889, No. 410,873; and it consists in the several details of construction, substantially as shown in the drawings, and hereinafter described and claimed.

In the accompanying drawings, A represents the frame of the machine, which may be of any desirable form and construction, and to the upper portion of this frame is attached the tongue B, having upon its rear end the seat C.

The frame of the machine is provided with hangers $a$ to form bearings for the journals of the rollers D E, to which they are connected, said rollers having open ends, as shown in Fig. 2, or closed ends, as shown in Fig. 1, as any special construction of roller is not essential to the operating parts of the machine.

To the longitudinal bars $b$ of the frame are suitably-connected end supports F, in which are journaled the ends of rollers G H, the former having spurs $c$ upon its periphery, and is designed to agitate the contents in the hopper above it and also distribute it. The roller H has pockets of suitable size, as shown at $d$, and such roller is intended for distributing and sowing clover, timothy, and all other small seed, and can be taken out and replaced with another roller having pockets of different size to suit the grain to be sown. To one end of the journal of each roller is a suitable sprocket-wheel, and engaging with the teeth of these wheels is a sprocket-chain, as shown in dotted lines, Fig. 2, such means of communicating motion from one roller to the other being such a common expedient that further description of it is considered unnecessary. The two hoppers over the rollers G H are formed by the hopper-sections I J K, which sections fit in grooves in the end supports F. The longitudinal brace L, which connects the end supports together, forms one of the sides or walls of the hopper over the roller H, and has a flange $e$ extending the length thereof. The end supports F are connected to the longitudinal bars $b$ by means of the hangers M, said supports being detachably connected thereto, so that they can be removed with their hopper-sections and rollers when found desirable.

The end supports, the rollers journaled therein, the hopper-sections, and the longitudinal brace connecting said supports together form an attachment to the frame of the machine, which can be removed and the large rollers D E used without it when found desirable. The journal or shaft of the rollers D E has a compound sprocket-wheel N, and on the journal of the roller G is a similar wheel O with which engages a sprocket-chain $f$, and through these wheels and chain and the wheels and chain on the opposite ends of the rollers G H motion is imparted thereto, which may be varied by adjusting the chain $f$ on the different diameters of the wheels N O, as deemed necessary to govern the distribution of the contents of the hoppers. The end supports F have a rod P extending through them, and the ends of the rod are screw-threaded to receive nuts $g$ for holding the rod in position, and upon it are rigidly-connected dogs R, one of which is provided with a lever-handle S for turning the rod. This handle has a laterally-extending flange $h$ upon its outer side to engage with a toothed plate T, secured to one of the end supports F, the dogs R engaging with notched plates U upon the outer side of the hopper-section K, whereby the adjustment of the section with relation to the periphery of the roller G can be regulated and held in such adjusted position to govern the discharge of the contents of the hopper.

The rod P serves a twofold purpose, in that it serves as a brace for the end supports upon the opposite side to that of the brace L and as a medium to carry the dogs R, secured thereon.

Having now fully described my invention, what I claim as new, and desire to secure by Letters Patent, is—

1. In a combined roller and seeder, the combination, with a suitable frame carrying the rollers D E and the bars *b*, having the hangers M, of the seeder attachment removably connected to the hangers and consisting of the rollers G H, the removable hopper-sections, and the end supports F, connected together by the longitudinal brace L, substantially as and for the purpose set forth.

2. In a combined roller and seeder, the combination, with the rollers D E, of the seeder attachment consisting of the end supports F, provided with the rollers G H and removable hopper-sections, and the rod P, having dogs R and the lever-handle S for turning the rod, and the toothed plate T, and notched plates U, substantially as and for the purpose described.

In testimony that I claim the above I have hereunto subscribed my name in the presence of two witnesses.

THOMAS A. BUTLER.

Witnesses:
  MARY ANN REED,
  FANNIE LOIS REED.